H. B. PATTEN.
MEANS FOR LOCKING DEMOUNTABLE RIMS TO WHEELS.
APPLICATION FILED DEC. 7, 1920.
1,418,458.
Patented June 6, 1922.
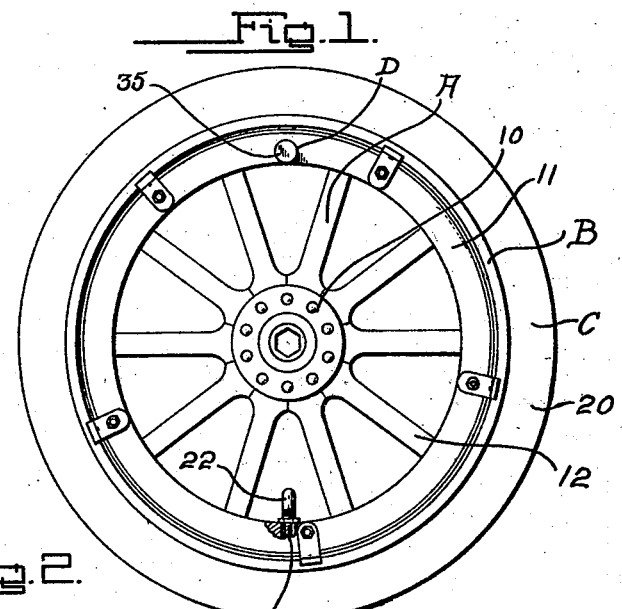
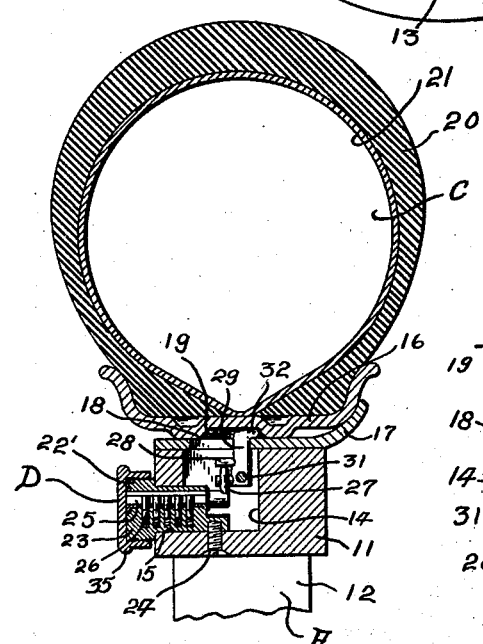
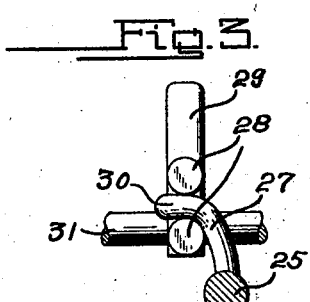
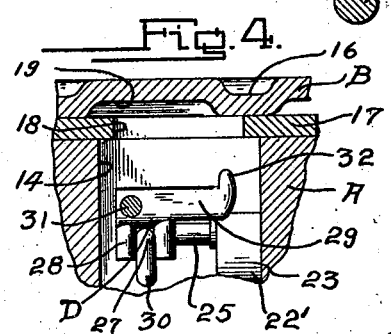
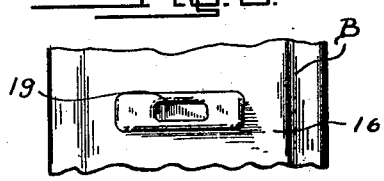
Inventor
Harry B. Patten

UNITED STATES PATENT OFFICE.

HARRY B. PATTEN, OF WESTFIELD, INDIANA.

MEANS FOR LOCKING DEMOUNTABLE RIMS TO WHEELS.

1,418,458. Specification of Letters Patent. Patented June 6, 1922.

Application filed December 7, 1920. Serial No. 428,949.

*To all whom it may concern:*

Be it known that I, HARRY B. PATTEN, a citizen of the United States, residing at Westfield, in the county of Hamilton and State of Indiana, have invented certain new and useful Improvements in Means for Locking Demountable Rims to Wheels, of which the following is a specification.

This invention relates to attachments for vehicle wheels and rims and the primary object of the invention is to provide an improved means for locking demountable rims and their tires on the fellies of wheels so that the removal of the rims and tires by unauthorized persons is prevented.

Another object of the invention is to provide a lock carried by the felly of the wheel diametrically opposite to the tire valve receiving opening having a bolt arranged to project through the felly in engagement with a tire rim so that movement of the tire rim in any direction on the wheel will be prevented.

A further object of the invention is to provide an improved type of bolt for engagement with the tire rim and an improved means for actuating the bolt by a cylinder lock mechanism.

A still further object of the invention is to provide an improved means for holding a rim and tire on a vehicle rim against removal by unauthorized persons of the above character, which will be durable and efficient in use, one that is simple and easy to manufacture, and one which can be incorporated with a vehicle wheel and rim at a minimum cost.

With these and other objects in view, the invention consists in the novel construction, arrangement and formation of parts as will be hereinafter more specifically described, claimed and illustrated in the accompanying drawings, forming a part of this specification, in which drawings:

Figure 1 is an elevation of a vehicle wheel rim and tire, showing the improved lock incorporated therewith.

Figure 2 is a fragmentary transverse section through the vehicle wheel, rim and tire, showing the improved locking means for the rim associated with the wheel and rim and illustrating the position of the bolt when in its operative position.

Figure 3 is an enlarged fragmentary sectional view through a portion of the lock showing the means for connecting the cam arm of the cylinder lock with the bolt, the arm being in raised position for holding the bolt in its operative position against movement.

Figure 4 is an enlarged transverse section through the vehicle felly and rim looking in opposite direction from Figure 2 and showing the bolt in its lowered inoperative position.

Figure 5 is a fragmentary elevation of a rim constructed in accordance with this invention for receiving the locking bolt.

Referring to the drawings in detail, wherein similar reference characters designate corresponding parts throughout the several views, the letter A indicates a vehicle wheel, B, a rim, C a tire, and D the improved locking mechanism for the wheel and rim.

The wheel A may be of the ordinary or any preferred construction or type and as shown includes the hub 10, the felly 11, and the connecting spokes 12. The felly 11 is provided with the usual opening 13 for the tire valve and at a point diametrically opposite the opening the felly is provided with a chamber 14 and a communicating passageway 15, the purpose of which will be hereinafter more specifically described.

The rim B is also of the ordinary or any preferred construction and may be of the usual demountable type and includes the body 16 which is mounted upon the felly band 17. The felly band 17 is provided with a slot 18 which communicates with the chamber 14 for a purpose which will also hereinafter more fully appear. As stated the rim is of the ordinary construction with the exception of a struck out portion 19 which is adapted to align with the slot 18. The struck out portion 19 is formed in the rim diametrically opposite the usual valve receiving opening. The tire C is of any preferred construction or make and forms no part of the invention and as shown includes the casing 20 and the inner tube 21, the valve 22 of which is positioned through the opening 13 in the ordinary manner.

The improved locking means D for the wheel and rim includes a cylinder lock structure 22' having the case 23 thereof arranged in the passage way 15 formed in the felly 11. As shown the case 23 is secured in the passageway 15 by means of a screw 24, although any other preferred fastening means may be employed. The case 23 rotatably receives the revolving plug 25 which is provided with the usual keyway. The plug 25 and the case 23 contains a series of aligning chambers which are adapted to receive the pin tumblers 26. The pin tumblers 26 are normally urged into the revolving plug 25 by means of springs and followers as clearly shown in Figure 3 of the drawings. The inner end of the revolving plug 25 carries a cam actuating arm 27 which is disposed in the path of and between a pair of outwardly extending retaining fingers 28 which are formed upon the lower end of the locking bolt 29. The cam arm 27 extends radially from the plug 25 and is provided with the arcuate terminal 30. The bolt 29 is carried by a rotatable shaft 31 adjacent to its inner end and the fingers 28 are arranged on one side of the shaft 31 as clearly disclosed in Figures 2 and 3 of the drawings. The bolts 29 and the inner end of the plug 25 and its cam arm 27 are arranged within the chamber 14 and the outer end of the bolt 29 is adapted to extend through the slot 18 formed in the portion 17 of the rim B. The outer end of the bolt is provided with a hooked terminal 32 which is adapted to engage over the portion 17 of the rim. The hooked terminal 32 of the bolt 29 forms a head which is adapted to engage in the struck out portion 19 of the body 16 of the rim B. When the head or hook 32 is positioned in the struck out portion 19 in the rim, circumferential movement of the rim on the felly is absolutely precluded, and as the rim is engaged at one point by the tire valve 22 and at a diametrically opposite point by the head or hook 32, movement of the rim laterally on the felly is also precluded. It thus can be seen that movement of the rim off of the felly by unauthorized persons will be eliminated.

In operation of the improved lock, the key is inserted in the keyway in the usual manner and when the tumblers have been moved from out of engagement with the plug 25 the same can be turned. This moves the cam arm 27 in such a manner as to raise and lower the bolt 29 from into and out of operative position. By referring to Figure 3 of the drawings, it can be seen that when the plug 25 is turned in a counter clockwise direction, the arcuate end 30 of the cam arm 27 will engage the lowermost or innermost finger 28 and thus swing the bolt downwardly. When the plug 25 is rotated in a clockwise direction, the curved end 30 thereof will engage the outermost finger 28 and thus raise the bolt 29 into operative position.

If preferred the outer end of the case 23 may be provided with external threads for the reception of a threaded cap 35 which prevents the entrance of dirt or the like into the keyway.

Changes in details may be made without departing from the spirit or scope of this invention; but,

I claim:

1. In combination, a wheel including a felly having a chamber formed therein, a rim removably arranged on said felly having a struck out portion formed therein in alignment with said chamber, a lock fitted in said chamber including a bolt mounted for swinging movement in said chamber, a head formed on said bolt adapted to engage in the struck out portion made in the rim, and a cam carried by the lock structure arranged to engage the bolt.

2. In combination, a vehicle wheel including a felly having a tire valve receiving opening formed therein, and a chamber formed therein at a point diametrically opposite to said opening, a rim removably arranged on said felly having a struck out socket formed therein, and a lock structure fitted in said chamber including a case, a revoluble plug, a cam arm carried by the plug, a hinged bolt, the bolt having a hooked head formed therein arranged to be brought into and out of engagement with the socket formed in the rim and a pair of outwardly extending spaced fingers formed on its opposite end arranged to receive the cam arm therebetween, the revoluble plug having a keyway formed therein, and a cap detachably carried by said case.

HARRY B. PATTEN.